US008443345B2

(12) United States Patent　　　　(10) Patent No.:　　US 8,443,345 B2
Carteri et al.　　　　　　　　　　　(45) Date of Patent:　　May 14, 2013

(54) DYNAMIC PROCESSING OF EMBEDDED COMPILED PROGRAMMING LANGUAGE CODE

(75) Inventors: Francesco M. Carteri, Rome (IT); Filomena Ferrara, Marino (IT); Alessandro Scotti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1204 days.

(21) Appl. No.: 12/323,771

(22) Filed: Nov. 26, 2008

(65) Prior Publication Data

US 2010/0131951 A1　　May 27, 2010

(51) Int. Cl.
  *G06F 9/445*　　(2006.01)
  *G06F 9/46*　　(2006.01)
(52) U.S. Cl.
  USPC .......................................................... 717/137
(58) Field of Classification Search .................... 717/137
  See application file for complete search history.

(56) References Cited

PUBLICATIONS

Chen et al., "Studying Energy Trade Offs in Offloading Computation/Compilation in Java-Enabled Mobile Devices", 2004.*
Newsome et al., "Proxy Compilation of Dynamically Loaded Java Classes with MoJo", 2002.*
Chen et al., "Energy-Aware Compilation and Execution in Java-Enabled Mobile Devices", 2003.*
Linda Paulson, "Building Rich Web Applications with Ajax", 2005.*
Sang Shin, "Google Web Toolkit (GWT)", 2007.*
Malkhi et al., "Secure Execution of Java Applets Using a Remote Playground", 2000.*
"Google Web Toolkit", http://code.google.com/webtoolkit/overview.html (obtained Jul. 21, 2008).
"JavaServer Pages Overview", http://java.sun.com/products/jsp/overview.html (obtained Jul. 21, 2008) 1994-2008.
"Jaxer The Ajax Server", http://www.aptana.com/jaxer (obtained Jul. 21, 2008) 2005-2008.

* cited by examiner

*Primary Examiner* — Corey S Faherty
(74) *Attorney, Agent, or Firm* — Yee & Associates, P.C.; Jeffrey S. LaBaw

(57) ABSTRACT

Development using the JavaScript programming language can be limited since JavaScript code is interpreted. Compiling code at a client may interfere with the dynamicity and portability of web pages. Dynamicity and portability of web pages can be preserved while providing the features of a compiled programming language. A compiled programming language code can be embedded within an interpreted programming language code. The embedded compiled programming language code can be extracted and compiled with resources of a server to deliver the robustness and flexibility of the compiled programming language without burdening a client with compiling.

20 Claims, 4 Drawing Sheets

DYNAMIC PROCESSING OF EMBEDDED COMPILED PROGRAMMING LANGUAGE CODE

BACKGROUND

Embodiments of the inventive subject matter generally relate to the field of web technology, and, more particularly, to embedded Java code.

Web 2.0 refers to a paradigm shift in the ways developers and users utilize the World Wide Web. Web 2.0 is characterized by enhanced creativity and security, social networking and online collaboration. Web 2.0 development is based heavily on JavaScript® code. The JavaScript programming language can be complex to write and debug because there is no compiler to assist developers.

SUMMARY

Embodiments include a method directed to a web server receiving a request from a web client for a webpage that indicates an interpreted programming language code. It is determined that a compiled programming language code is embedded in the interpreted programming language code. The embedded programming language code is compiled to generate executable code. A service is associated with the executable code, wherein the service runs the executable code when called. The embedded compiled programming language code is replaced with a call to the service. The interpreted programming language code with the call to the service is supplied to the web client.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to AJAX web technologies, embodiments may be implemented with other technologies such as the Microsoft® Silverlight® system. Although examples refer to JavaScript code, embodiments may be implemented in other interpreted programming language codes. In addition, examples also refer to Java code, embodiments may be implemented in other compiled programming language codes. In other instances, well-known instruction instances, protocols, structures and techniques have not been shown in detail in order not to obfuscate the description.

Development using the JavaScript programming language can be limited since JavaScript code is interpreted. Compiling code at a client, however, may interfere with the dynamicity and portability of web pages. Dynamicity and portability of web pages can be preserved while also providing the features of a compiled programming language. A compiled programming language code can be embedded within an interpreted programming language code. The embedded compiled programming language code can be extracted and compiled with resources of a server to deliver the robustness and flexibility of the compiled programming language without burdening a client with compiling. The embedded compiled programming language code can then be replaced with a service call that executes executable code generated from compiling the extracted compiled programming language code. To illustrate, Java code may be embedded into JavaScript code using a special tag. An embedded Java code processing unit on a server can recognize the embedded Java code and extract the embedded Java code. The embedded Java code processing unit generates an instance of a Java class based on the embedded Java code and compiles the instance of the Java class to generate executable code. The embedded Java code processing unit then associates an AJAX service with the executable code. The embedded Java code processing unit substitutes the embedded Java code with a call to the AJAX service.

Figure 1:
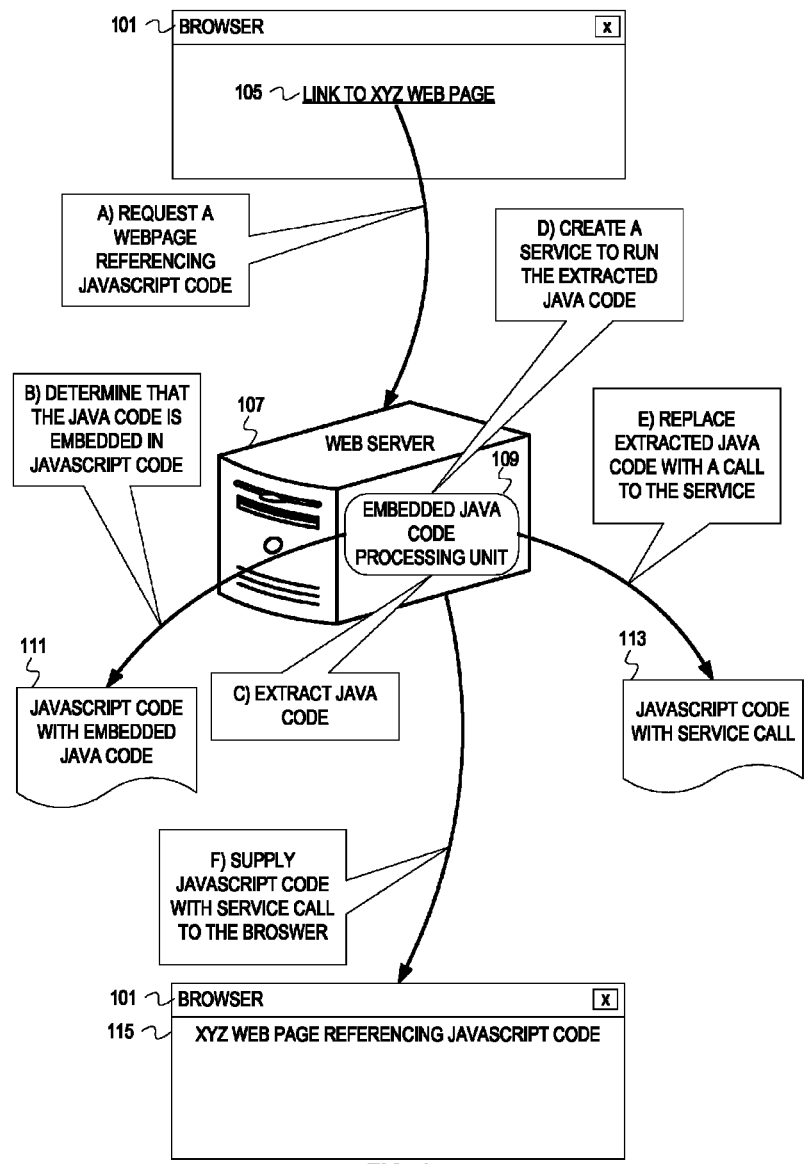
FIG. 1 is an example conceptual diagram of compiling Java code embedded in a JavaScript code.

FIG. 1 is an example conceptual diagram of compiling Java code embedded in a JavaScript code. At stage A, a browser 101 requests a webpage referenced by link 105 from a web server 107. The browser 101 requests a webpage in response to a user clicking a link to a webpage, typing a web address into an address bar of the web browser, etc. The JavaScript code may be embedded in the HyperText Markup Language (HTML) of the webpage or it may be referenced as an include file of the webpage.

At stage B, an embedded Java code processing unit 109 on the web server 107 determines that Java code is embedded in the JavaScript code 111. The embedded Java code is identified in the JavaScript code 111 by a special tag (e.g., <jajax>). In some examples, the embedded Java code processing unit 109 examines the JavaScript code 111 to determine if the JavaScript code contains the special tag or metadata indicating that the Java code is embedded in the JavaScript code. In other examples, the embedded Java code processing unit 109 examines the file extension because web pages referencing JavaScript code with embedded Java code may have special extensions (e.g., jajax). For example, a webpage references a JavaScript file as an include file. Java code is embedded within JavaScript code in the JavaScript file. Code Snippet 1 is an example code snippet of JavaScript code with embedded Java code.

---

Code Snippet 1

```
var obj = {name: "name1", age: 35}
//this code the object above in a file
<jajax className="MyTest" method="test" param1=obj>
    com.ibm.ajax.common.json.JsonObject result = null;
    result = new com.ibm.ajax.common.json.JsonObject( );
java.io.File file= new java.io.File("C:\\MyFile.txt");
java.io.FileWriter fos;
    try {
        fos = new java.io.FileWriter(file);
java.lang.String str = "name is: " + param1.name + ", age: " +
    param1.age;
        fos.write(str);
        result = new com.ibm.ajax.common.json.JsonObject( );
        result.addMember("result", success);
    } catch (java.io.IOException e) {
            result.addMember("result", "failure");
    }
</jajax>
```

At stage C, the embedded Java code processing unit 109 extracts the Java code from the JavaScript code 111. In this example, the Java code between the <jajax> tags in Code Snippet 1 is extracted. The embedded Java code processing unit 109 generates a Java class instance based on the Java code and compiles the Java class instance. The Java class instance is expressed in Code Snippet 2.

---

Code Snippet 2

---

```
public class MyTest {
public com.ibm.ajax.common.json.JsonObject
    test(com.ibm.ajax.common.json.JsonObject object){
    com.ibm.ajax.common.json.JsonObject result = null;
    result = new com.ibm.ajax.common.json.JsonObject( );
    java.io.File file= new java.io.File("C:\\MyFile.txt");
    java.io.FileWriter fos;
    try {
        fos = new java.io.FileWriter(file);
java.lang.String str = "name is: " + object.getMember("name") + ", age: " + object.getMember("age");
        fos.write(str);
        result.addMember("result", "success");
    } catch (java.io.IOException e) {
        result.addMember("result", "failure");
    }
        return result;
    }
}
```

---

At stage D, the embedded Java code processing unit 109 creates a service to run the extracted Java code. In this example, the embedded Java code processing unit 109 creates an AJAX service to run the extracted Java code.

At stage E, the embedded Java code processing unit 109 replaces the extracted Java code with a call to the service. The JavaScript code with embedded Java code 111 becomes the JavaScript code with service call 113. In this example, the embedded Java code processing unit 109 replaces the embedded Java code between the <jajax> tags in Code Snippet 1 with a call to the AJAX service. Code Snippet 3 expresses the JavaScript code with the AJAX call.

---

Code Snippet 3

---

```
var obj = {name: "name1", age: 35}
//this code the object above in a file
var service = new ajaxcommon.services.SyncService("MyTest.test");
var parameters = {obj};
    try {
      //calling the synch service
      service.url = serviceUrl;
      service.usePostMethod = true; //use POST
      //executing the synch service
      service.execute(parameters);
    } catch ( e ) {
      console.debug(e);
    }
//the object result is available in service.output
console.debug("result: " + service.output);
```

---

At stage F, the embedded Java code processing unit 109 supplies the JavaScript code with service call 113 to the browser 101. In response, the browser 101 displays the webpage 115 referencing the JavaScript code. In this example, the webpage references a JavaScript file with an include directive. Code Snippet 1 is replaced with Code Snippet 3 in the JavaScript file which is supplied to the browser 101. When the browser 101 executes the code in Code Snippet 3, the AJAX call causes the web server 107 to execute Code Snippet 2.

Figure 2:
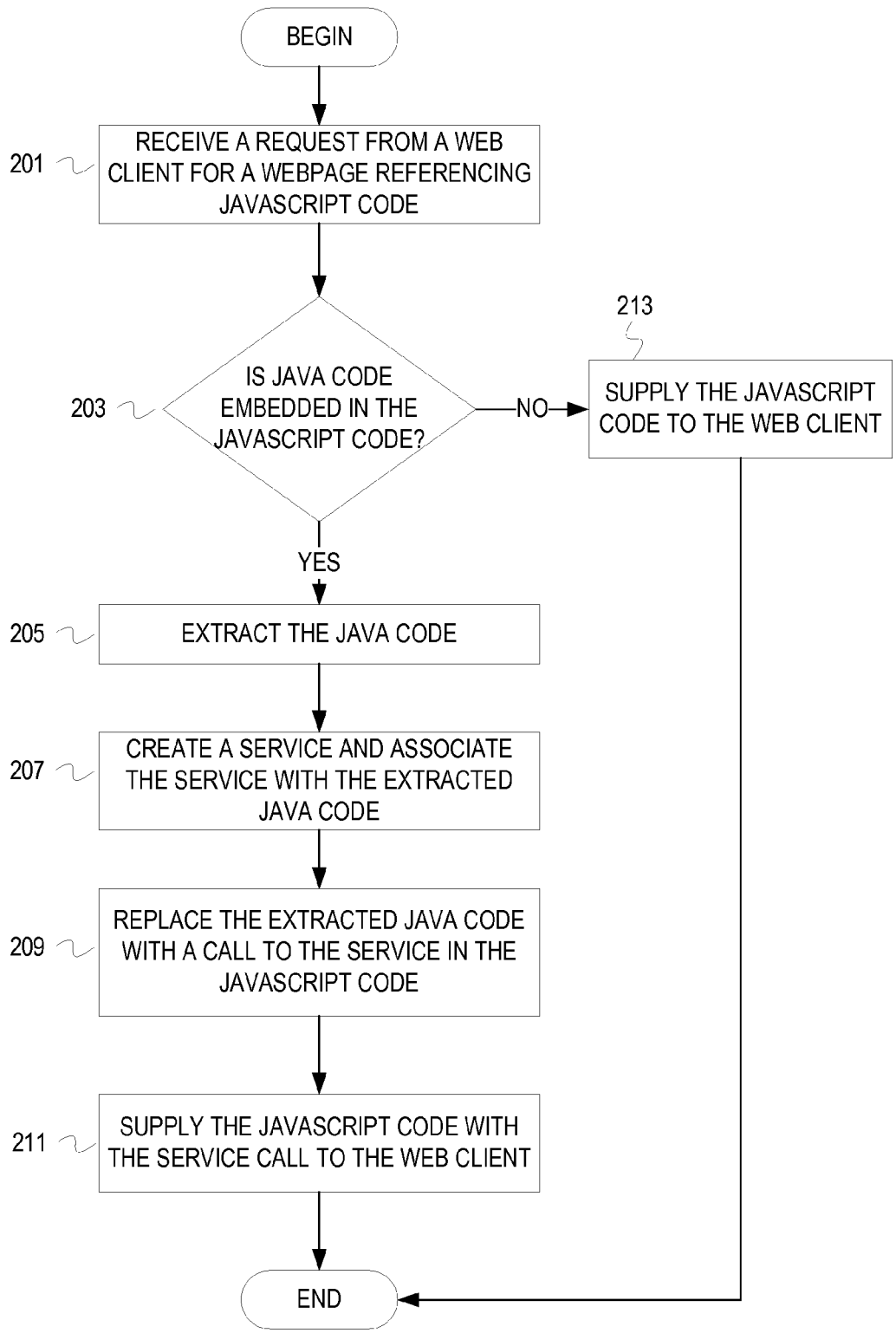
FIG. 2 is a flowchart depicting example operations for running Java code embedded in a JavaScript file.

FIG. 2 is a flowchart depicting example operations for compiling Java code embedded in a JavaScript file. Flow begins at block 201, where a request is received from a web client for a webpage referencing JavaScript code. For example, the webpage comprises a JavaScript file.

At block 203, it is determined if Java code is embedded in the JavaScript code. For example, a file extension indicates that Java code is embedded in a JavaScript file. If Java code is embedded in the JavaScript code, flow continues at block 205. If Java code is not embedded in the JavaScript code, flow continues at block 213.

At block 205, the Java code is extracted. For example, the Java code is embedded in a JavaScript file between special tags. The Java code between the special tags is extracted. Extracting the Java code further comprises generating a Java class instance based on the Java code and compiling the Java class instance. The Java class instance is generated based on recognizing tokens in the extracted Java code. In Code Snippet 1, for example, a Java class instance "MyTest" is generated based on recognizing the token "className." Another token "method" causes a method "test" to be created within the class "MyTest."

Parameters are passed between the JavaScript code and Java code via a Java class (e.g., JsonObject( ) in Code Snippet 1). The Java class allows any JavaScript object to be represented and used in the Java code.

At block 207, a service is created and associated with Java class instance. The service runs executable code generated by compiling the Java class instance when called. For example, an AJAX service is created. In some cases, a service may already exist. If a service already exists, the service is associated with the Java class.

At block 209, the embedded Java code is replaced with a call to the service in the JavaScript code. As an example, the Java code is replaced with a call to an AJAX service.

At block 211, the JavaScript code with the service call is supplied to the web client. In the previous example, the JavaScript code includes an AJAX call to an AJAX service. When the browser executes the AJAX call, the server initiates the AJAX service to run the extracted Java code.

If Java code is not embedded in the JavaScript code, the JavaScript code is supplied to the web client at block 213.

Figure 3:
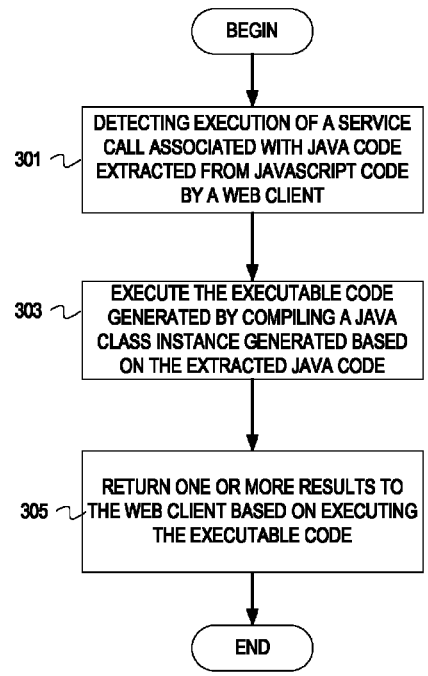
FIG. 3 is a flowchart depicting example operations for running Java code embedded in a JavaScript file.

FIG. 3 is a flowchart depicting example operations for running Java code embedded in a JavaScript file. Flow begins at block 301, where the execution of a service call associated with Java code extracted from JavaScript code by a web client is detected. For example, the service call references a Java class name of the extracted Java code.

At block 303, the executable code generated by compiling a Java class instance generated based on the extracted Java code is executed.

At block 305, one or more results are returned to the web client based on executing the executable code.

It should be understood that the depicted flowchart are examples meant to aid in understanding embodiments and should not be used to limit embodiments or limit scope of the claims. Embodiments may perform additional operations, fewer operations, operations in a different order, operations in parallel, and some operations differently. For instance, referring to FIG. 2, the operations for determining if Java code is embedded in the JavaScript code and extracting the Java code may occur in parallel.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 4:
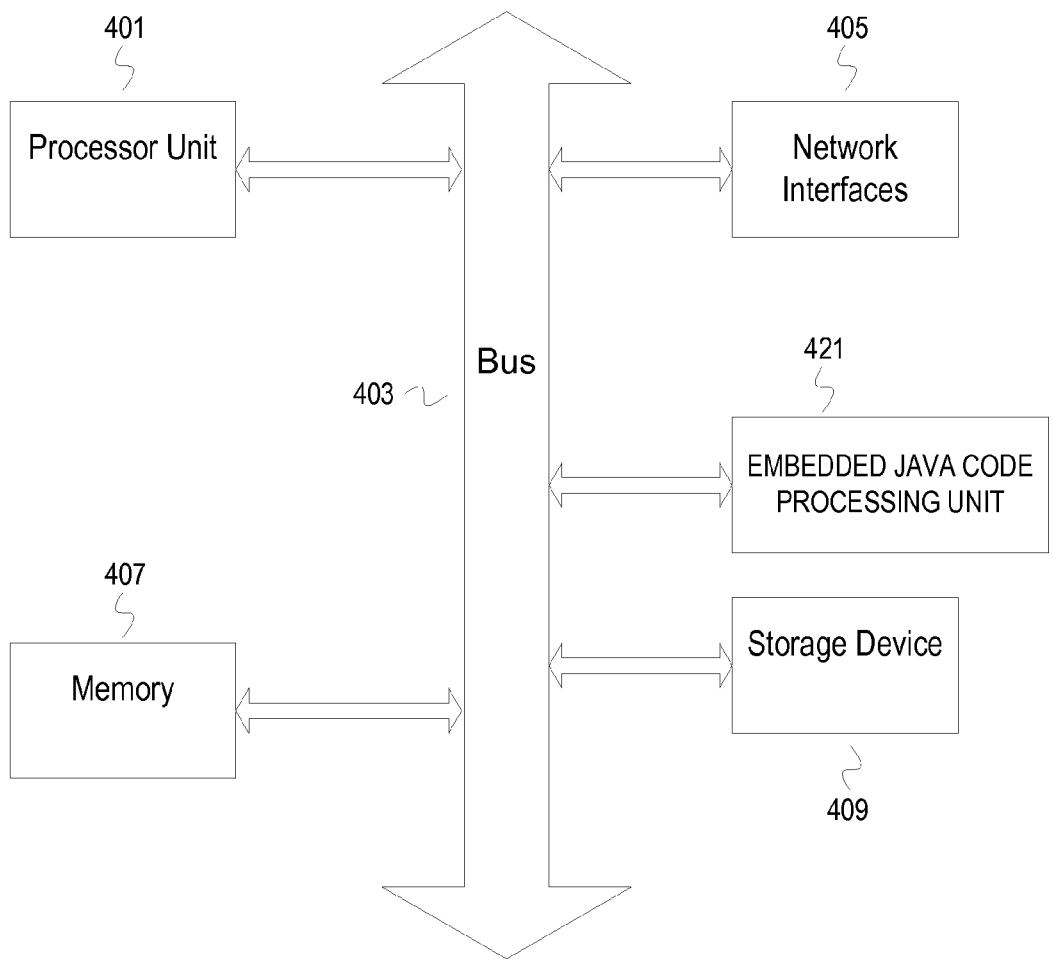
FIG. 4 depicts an example computer system.

FIG. 4 depicts an example computer system. A computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport®, InfiniBand®, NuBus, etc.), a network interface 405 (e.g., an ATM interface, an Ethernet interface, a Frame Relay interface, SONET interface, wireless interface, etc.), and a storage device(s) 409 (e.g., optical storage, magnetic storage, etc.). The computer systems also includes an embedded Java code processing unit 421 that determines that Java code is embedded in JavaScript code, extracts the Java code, creates a service to run the Java code and replaces the Java code with a call to the service. Any one of these functionalities may be partially (or entirely) implemented in hardware and/or on the processing unit 401. For example, the functionality may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the inventive subject matter is not limited to them. In general, techniques for a JavaScript compiler for embedded Java code as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    a web server receiving a request from a web client for a webpage that indicates an interpreted programming language code;
    determining that a compiled programming language code is embedded in the interpreted programming language code;
    compiling the embedded compiled programming language code to generate executable code;
    associating a service with the executable code, wherein the service runs the executable code when called;
    replacing the embedded compiled programming language code with a call to the service; and
    supplying to the web client the interpreted programming language code with the call to the service.

2. The method of claim 1, wherein the interpreted programming language code is at least one of embedded in the HyperText Markup Language of the webpage, and within a file referenced by the webpage.

3. The method of claim 1, wherein said determining that the compiled programming language code is embedded in the interpreted programming language code comprises at least one of examining the interpreted programming language code for special tags or metadata and examining a file extension in a reference of the webpage.

4. The method of claim 1 further comprising wherein the step of compiling the embedded compiled programming language code comprises:
    generating a compiled programming language class instance based on the embedded compiled programming language code.

5. The method of claim 4, further comprising recognizing tokens within the embedded compiled programming language code, wherein said generating the compiled programming language class is based, at least in part, on said recognizing.

6. The method of claim 1 further comprising the service running the executable code in response to the web client executing the service call.

7. The method of claim 6 further comprising returning one or more results to the web client based on running the executable code.

8. The method of claim 1, wherein the service comprises an AJAX service.

9. A method comprising:
- a web server detecting execution of a service call by a web client, wherein the service call is associated with executable code generated from compiling Java code extracted from JavaScript code and replaced with the service call, wherein the JavaScript code corresponds to a web page requested by the web client;
- executing the executable code; and
- returning one or more results to the web client based on executing the executable code.

10. One or more non-transitory machine-readable media having stored therein a program product, which when executed by a set of one or more processor units causes the set of one or more processor units to perform operations that comprise:
- a web server receiving a request from a web client for a webpage that indicates an interpreted programming language code;
- determining that a compiled programming language code is embedded in the interpreted programming language code;
- compiling the embedded compiled programming language code to generate executable code;
- associating a service with the executable code, wherein the service runs the executable code when called;
- replacing the embedded compiled programming language code with a call to the service; and
- supplying to the web client the interpreted programming language code with the call to the service.

11. The machine-readable media of claim 10, wherein the interpreted programming language code is at least one of embedded in the HyperText Markup Language of the webpage, and within a file referenced by the webpage.

12. The machine-readable media of claim 10, wherein said determining that the compiled programming language code is embedded in the interpreted programming language code comprises at least one of examining the interpreted programming language code for special tags or metadata and examining a file extension in a reference of the webpage.

13. The machine-readable media of claim 10, wherein the operation of compiling the embedded compiled programming language code comprises:

generating a compiled programming language class instance based on the embedded compiled programming language code.

14. The machine-readable media of claim 13, wherein the operations further comprise recognizing tokens within the embedded compiled programming language code, wherein said generating the compiled programming language class is based, at least in part, on said recognizing.

15. The machine-readable media of claim 10, wherein the operations further comprise the service running the executable code in response to the web client executing the service call.

16. The machine-readable media of claim 15, wherein the operations further comprise returning one or more results to the web client based on running the executable code.

17. The machine-readable media of claim 10, wherein the service comprises an AJAX service.

18. An apparatus comprising:
- a set of one or more processing units;
- a network interface; and
- an embedded compiled programming language code processing unit operable to,
  - receive a request from a web client for a webpage that indicates an interpreted programming language code;
  - determine that a compiled programming language code is embedded in the interpreted programming language code;
  - compile the embedded compiled programming language code to generate executable code;
  - associate a service with the executable code, wherein the service runs the executable code when called;
  - replace the embedded compiled programming language code with a call to the service; and
  - supply to the web client the interpreted programming language code with the call to the service.

19. The apparatus of claim 18, wherein said the embedded compiled programming language code processing unit being operable to determine that the compiled programming language code is embedded in the interpreted programming language code comprises the embedded compiled programming language code processing unit being operable to at least one of examine the interpreted programming language code for special tags or metadata and detect a file extension in a reference of the webpage.

20. The apparatus of claim 18, wherein the embedded compiled programming language code processing unit comprises one or more machine-readable media.

* * * * *